United States Patent
Akl et al.

(10) Patent No.: US 11,871,276 B2
(45) Date of Patent: Jan. 9, 2024

(54) CENTRAL ENTITY ROUTING FOR INTEGRATED ACCESS AND BACKHAUL DEPLOYMENTS

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Junyi Li, Fairless Hills, PA (US); Luca Blessent, Whitehouse Station, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,451

(22) Filed: May 28, 2021

(65) Prior Publication Data

US 2022/0386176 A1 Dec. 1, 2022

(51) Int. Cl.
*H04W 28/10* (2009.01)
*H04W 52/02* (2009.01)
*H04W 72/1263* (2023.01)

(52) U.S. Cl.
CPC ....... *H04W 28/10* (2013.01); *H04W 52/0216* (2013.01); *H04W 72/1263* (2013.01)

(58) Field of Classification Search
CPC ............. H04W 28/10; H04W 52/0216; H04W 36/0088; H04W 52/0258; H04W 72/50; H04W 72/1263; H04W 24/10; H04W 74/04; Y02D 30/70
See application file for complete search history.

(56) References Cited

U.S. PATENT DOCUMENTS

| | | | |
|---|---|---|---|
| 2017/0367029 A1* | 12/2017 | Alexander | H04W 48/12 |
| 2019/0036789 A1* | 1/2019 | Kaplunov | H04L 41/16 |
| 2019/0132740 A1* | 5/2019 | De | H04L 63/20 |
| 2021/0058826 A1* | 2/2021 | Mao | H04W 28/0933 |
| 2022/0132508 A1* | 4/2022 | Novlan | H04W 88/14 |

* cited by examiner

*Primary Examiner* — Omer S Mian
(74) *Attorney, Agent, or Firm* — Sevan Savsa; Harrity & Harrity, LLP

(57) ABSTRACT

Various aspects of the present disclosure generally relate to wireless communication. In some aspects, a central unit (CU) may transmit, to a first wireless node, an indication of a traffic flow configuration associated with a traffic flow on a traffic path that includes the first wireless node and a second wireless node. The CU may transmit, to the first wireless node, energy-saving scheduling information indicating one or more periods in which to use the traffic flow configuration for the traffic flow on the traffic path. Numerous other aspects are described.

30 Claims, 10 Drawing Sheets

CENTRAL ENTITY ROUTING FOR INTEGRATED ACCESS AND BACKHAUL DEPLOYMENTS

FIELD OF THE DISCLOSURE

Aspects of the present disclosure generally relate to wireless communication and to techniques and apparatuses for central entity routing for integrated access and backhaul (IAB) deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a central unit (CU) includes transmitting, to a first wireless node, an indication of a traffic flow configuration associated with a traffic flow on a traffic path that includes the first wireless node and a second wireless node; and transmitting, to the first wireless node, energy-saving scheduling information indicating one or more periods in which to use the traffic flow configuration for the traffic flow on the traffic path.

In some aspects, a method of wireless communication performed by a first wireless node includes receiving an indication of a traffic flow configuration associated with a traffic flow on a traffic path that includes the first wireless node and a second wireless node; receiving energy-saving scheduling information indicating one or more periods in which to use the traffic flow configuration for the traffic flow on the traffic path; and communicating in accordance with the traffic flow configuration and the energy-saving scheduling information during the one or more periods.

In some aspects, a CU for wireless communication includes a memory and one or more processors, coupled to the memory, configured to: transmit, to a first wireless node, an indication of a traffic flow configuration associated with a traffic flow on a traffic path that includes the first wireless node and a second wireless node; and transmit, to the first wireless node, energy-saving scheduling information indicating one or more periods in which to use the traffic flow configuration for the traffic flow on the traffic path.

In some aspects, a first wireless node for wireless communication includes a memory and one or more processors, coupled to the memory, configured to: receive an indication of a traffic flow configuration associated with a traffic flow on a traffic path that includes the first wireless node and a second wireless node; receive energy-saving scheduling information indicating one or more periods in which to use the traffic flow configuration for the traffic flow on the traffic path; and communicate in accordance with the traffic flow configuration and the energy-saving scheduling information during the one or more periods.

In some aspects, a non-transitory computer-readable medium storing a set of instructions for wireless communication includes one or more instructions that, when executed by one or more processors of a CU, cause the CU to: transmit, to a first wireless node, an indication of a traffic flow configuration associated with a traffic flow on a traffic path that includes the first wireless node and a second wireless node; and transmit, to the first wireless node, energy-saving scheduling information indicating one or more periods in which to use the traffic flow configuration for the traffic flow on the traffic path.

In some aspects, a non-transitory computer-readable medium storing a set of instructions for wireless communication includes one or more instructions that, when executed by one or more processors of a first wireless node, cause the first wireless node to: receive an indication of a traffic flow configuration associated with a traffic flow on a traffic path that includes the first wireless node and a second wireless node; receive energy-saving scheduling information indicating one or more periods in which to use the traffic flow configuration for the traffic flow on the traffic path; and communicate in accordance with the traffic flow configuration and the energy-saving scheduling information during the one or more periods.

In some aspects, an apparatus for wireless communication includes means for transmitting, to a first wireless node, an indication of a traffic flow configuration associated with a traffic flow on a traffic path that includes the first wireless node and a second wireless node; and means for transmitting, to the first wireless node, energy-saving scheduling information indicating one or more periods in which to use the traffic flow configuration for the traffic flow on the traffic path.

In some aspects, an apparatus for wireless communication includes means for receiving an indication of a traffic flow configuration associated with a traffic flow on a traffic path that includes the apparatus and a wireless node; means for receiving energy-saving scheduling information indicating one or more periods in which to use the traffic flow configuration for the traffic flow on the traffic path; and means for communicating in accordance with the traffic flow configuration and the energy-saving scheduling information during the one or more periods.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
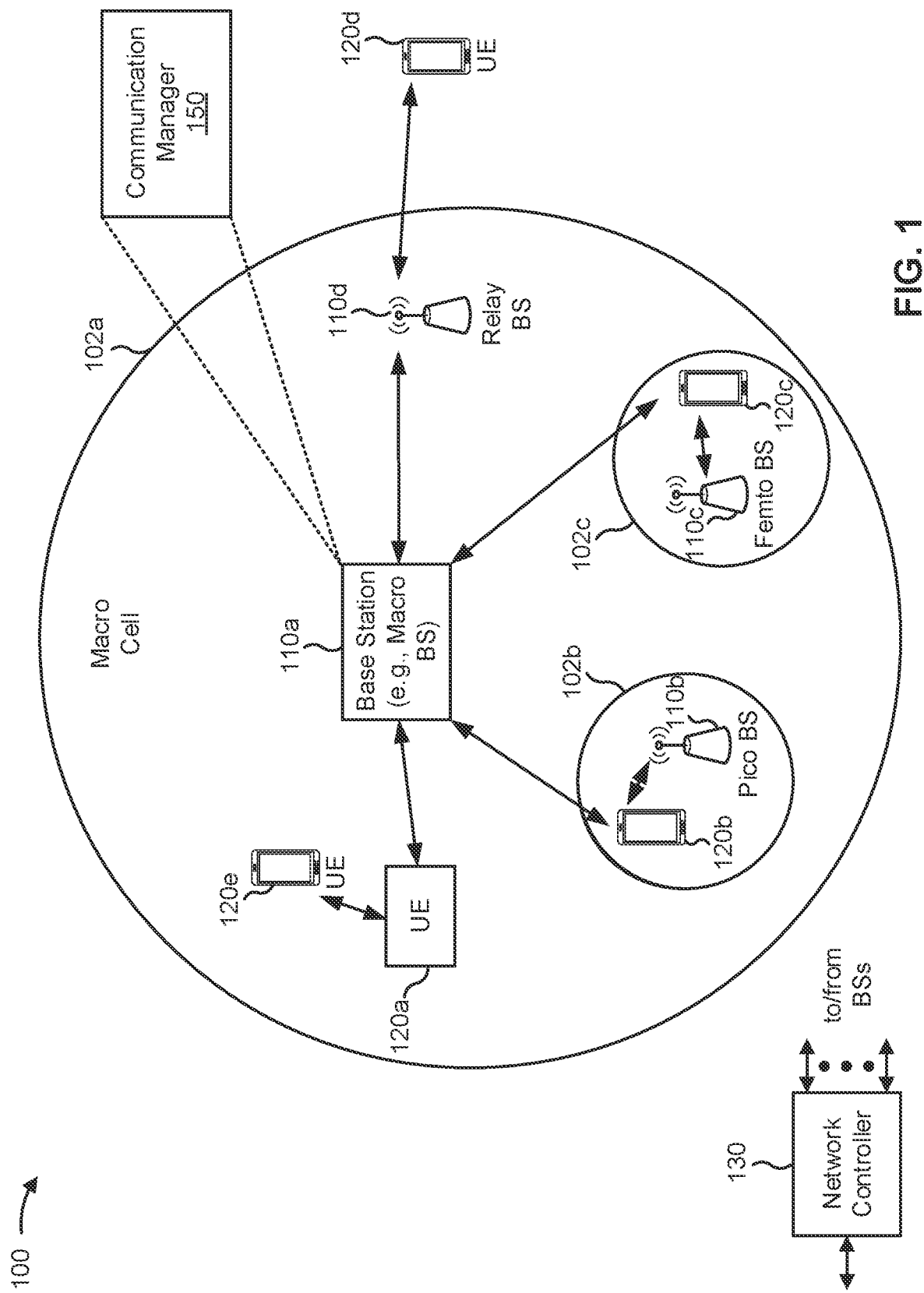
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a central unit (CU) (e.g., a base station 110) may include a communication manager 150. As described in more detail elsewhere herein, the communication manager 150 may transmit, to a first wireless node, an indication of a traffic flow configuration associated with a traffic flow on a traffic path that includes the first wireless node and a second wireless node; and transmit, to the first wireless node, energy-saving scheduling information indicating one or more periods in which to use the traffic flow configuration for the traffic flow on the traffic path. Additionally, or alternatively, the communication manager 150 may perform one or more other operations described herein.

In some aspects, a first wireless node (e.g., a base station 110) may include a communication manager 150. As described in more detail elsewhere herein, the communication manager 150 may receive an indication of a traffic flow configuration associated with a traffic flow on a traffic path that includes the first wireless node and a second wireless node; receive energy-saving scheduling information indicating one or more periods in which to use the traffic flow configuration for the traffic flow on the traffic path; and communicate in accordance with the traffic flow configuration and the energy-saving scheduling information during the one or more periods. Additionally, or alternatively, the communication manager 150 may perform one or more other operations described herein.

As indicated above, FIG. 1 is provided as an example. Other examples may differ from what is described with regard to FIG. 1.

Figure 2:
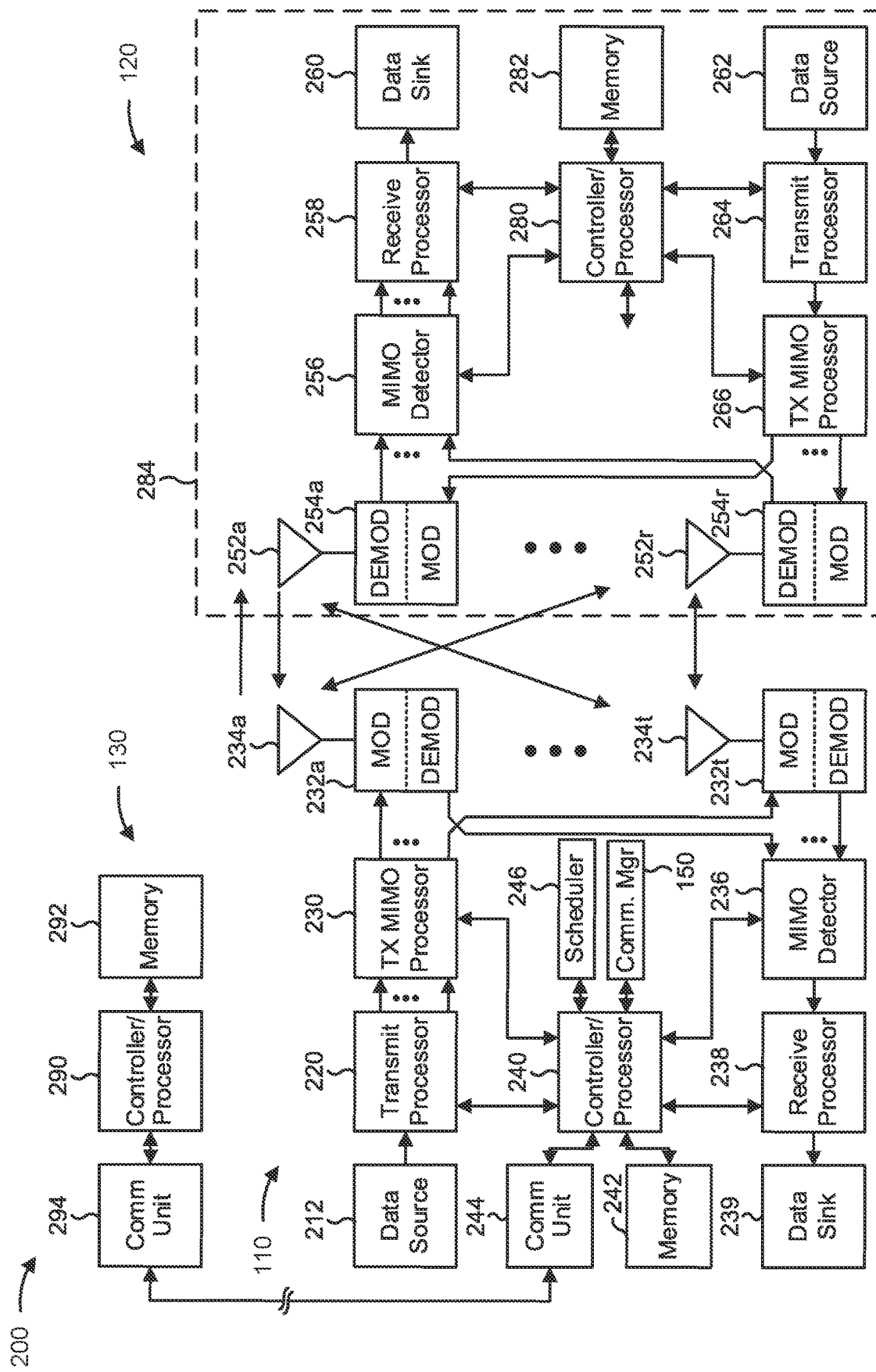
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIG. 7-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-9).

Controller/processor 240 of base station 110, controller/processor 280 of UE 120, and/or any other component(s) of FIG. 2 may perform one or more techniques associated with central entity routing for integrated access and backhaul (IAB) deployments, as described in more detail elsewhere herein. In some aspects, the central unit (CU) or wireless node described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a CU (e.g., the base station 110) includes means for transmitting, to a first wireless node, an indication of a traffic flow configuration associated with a traffic flow on a traffic path that includes the first wireless node and a second wireless node; and/or means for transmitting, to the first wireless node, energy-saving scheduling information indicating one or more periods in which to use the traffic flow configuration for the traffic flow on the traffic path. In some aspects, the means for the CU to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, a first wireless node (e.g., the base station 110) includes means for receiving an indication of a traffic flow configuration associated with a traffic flow on a traffic path that includes the first wireless node and a second wireless node; means for receiving energy-saving scheduling information indicating one or more periods in which to use the traffic flow configuration for the traffic flow on the traffic path; and/or means for communicating in accordance with the traffic flow configuration and the energy-saving scheduling information during the one or more periods. In some aspects, the means for the first wireless node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
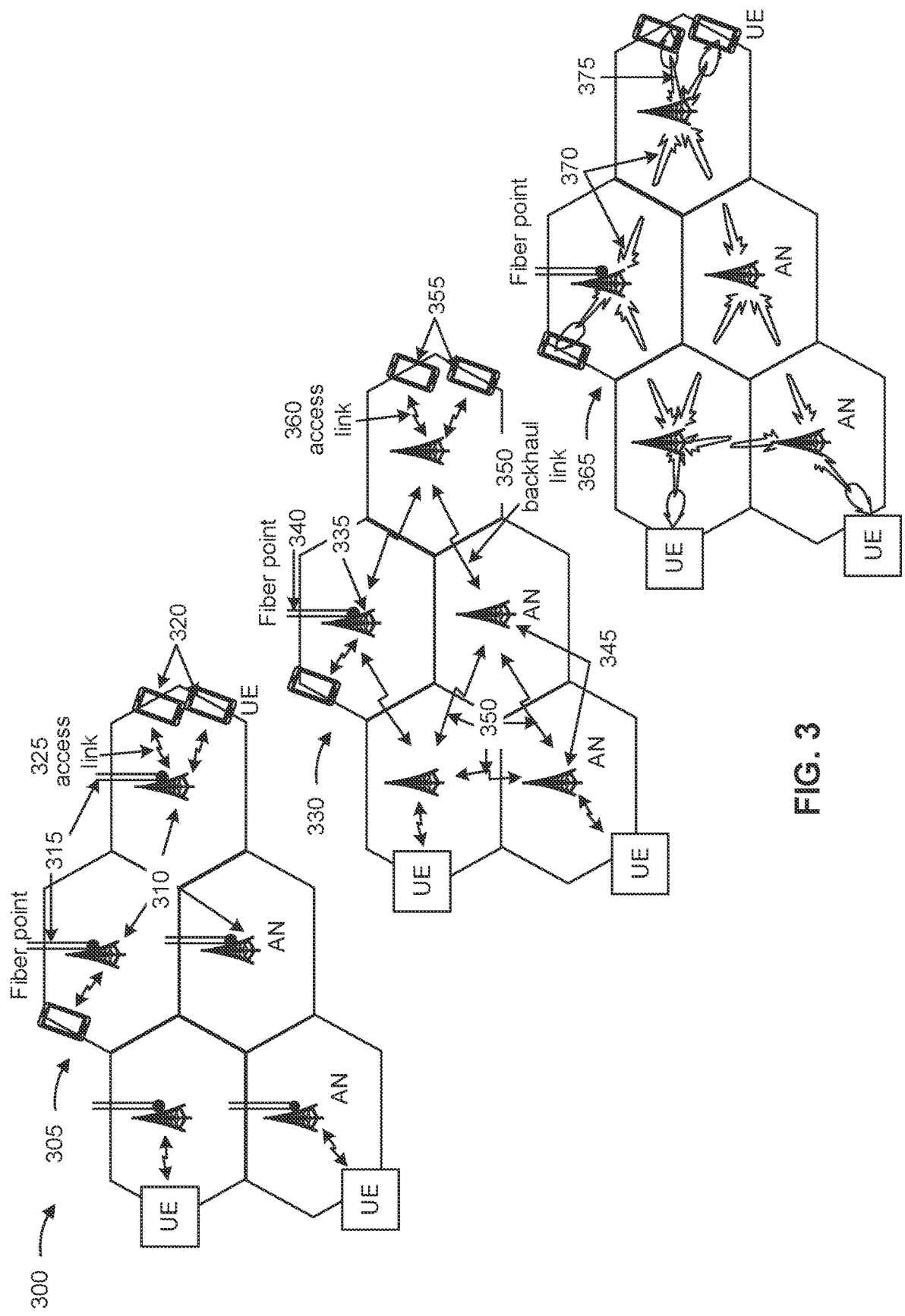
FIG. 3 is a diagram illustrating an example of radio access networks, in accordance with the present disclosure.

FIG. 3 is a diagram illustrating examples 300 of radio access networks, in accordance with the present disclosure.

As shown by reference number 305, a radio access network (RAN) may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network, an IAB network architecture, or an IAB deployment. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes or wireless nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station). Additionally, or alternatively, the BSs and UEs in FIG. 3 may be a set of wireless nodes. For example, an IAB-donor may be a base station with a connection to a core network and may include a central unit (CU) and a distributed unit (DU). The DU may connect to a first IAB node, which may further connect to a second IAB node (which may be a child wireless node of the first IAB node). In some cases, a particular destination wireless node, such as a UE, may connect to a particular source wireless node, such as an IAB donor-CU, via a plurality of possible topological links (e.g., via a plurality of different possible links between wireless nodes).

As indicated above, FIG. 3 is provided as an example. Other examples may differ from what is described with regard to FIG. 3.

Figure 4:
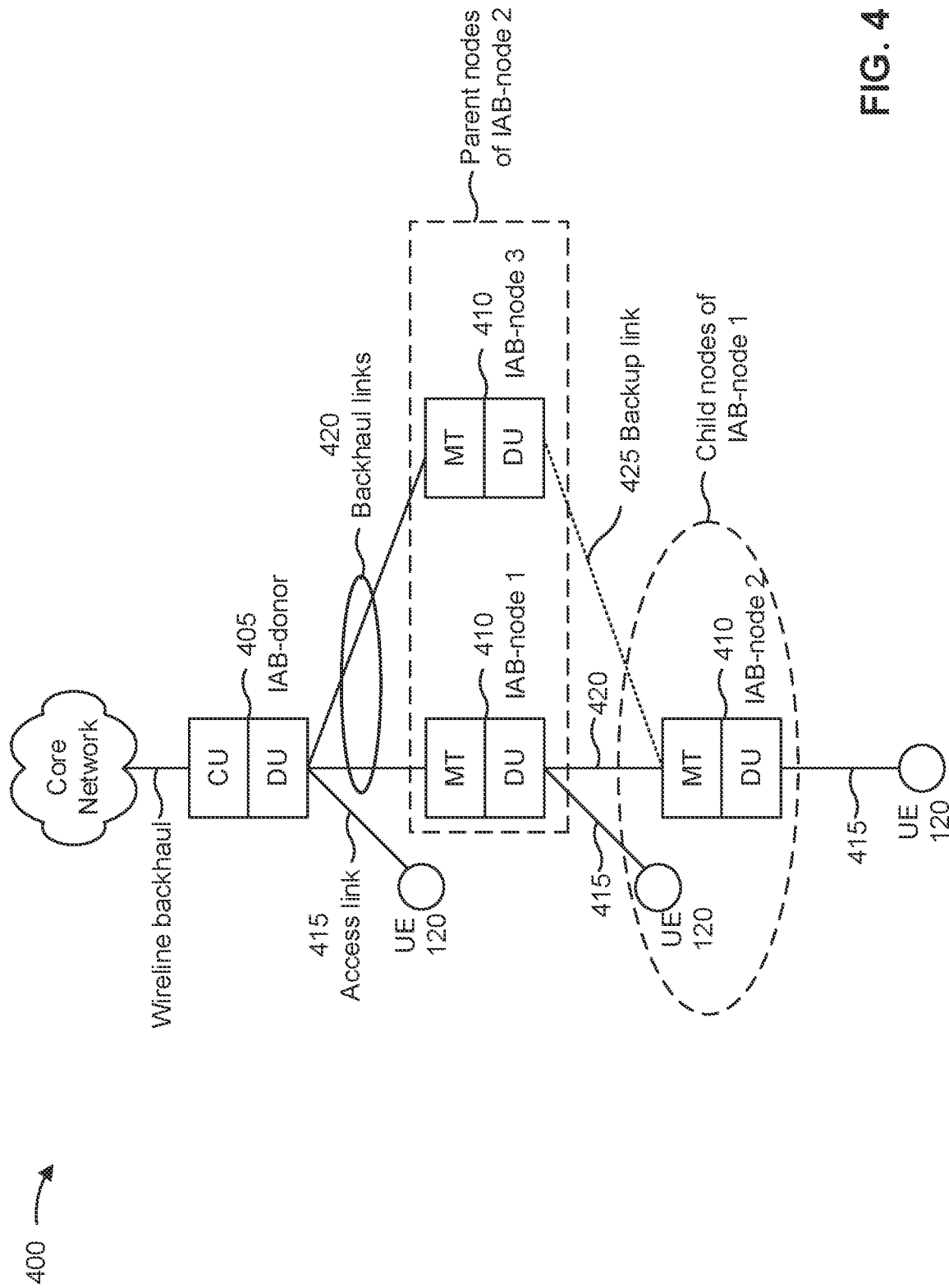
FIG. 4 is a diagram illustrating an example of an integrated access and backhauling (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., an access and mobility function (AMF)). In some aspects, an IAB donor 405 may include a base station 110, such as an anchor base station, as described above in connection with 3. As shown, an IAB donor 405 may include a CU, which may perform access node controller (ANC) functions and/or AMF functions. The central unit (CU) may configure a distributed unit (DU) of the IAB donor 405 and/or may configure one or more IAB nodes 410 (e.g., a mobile terminal (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Figure 5:
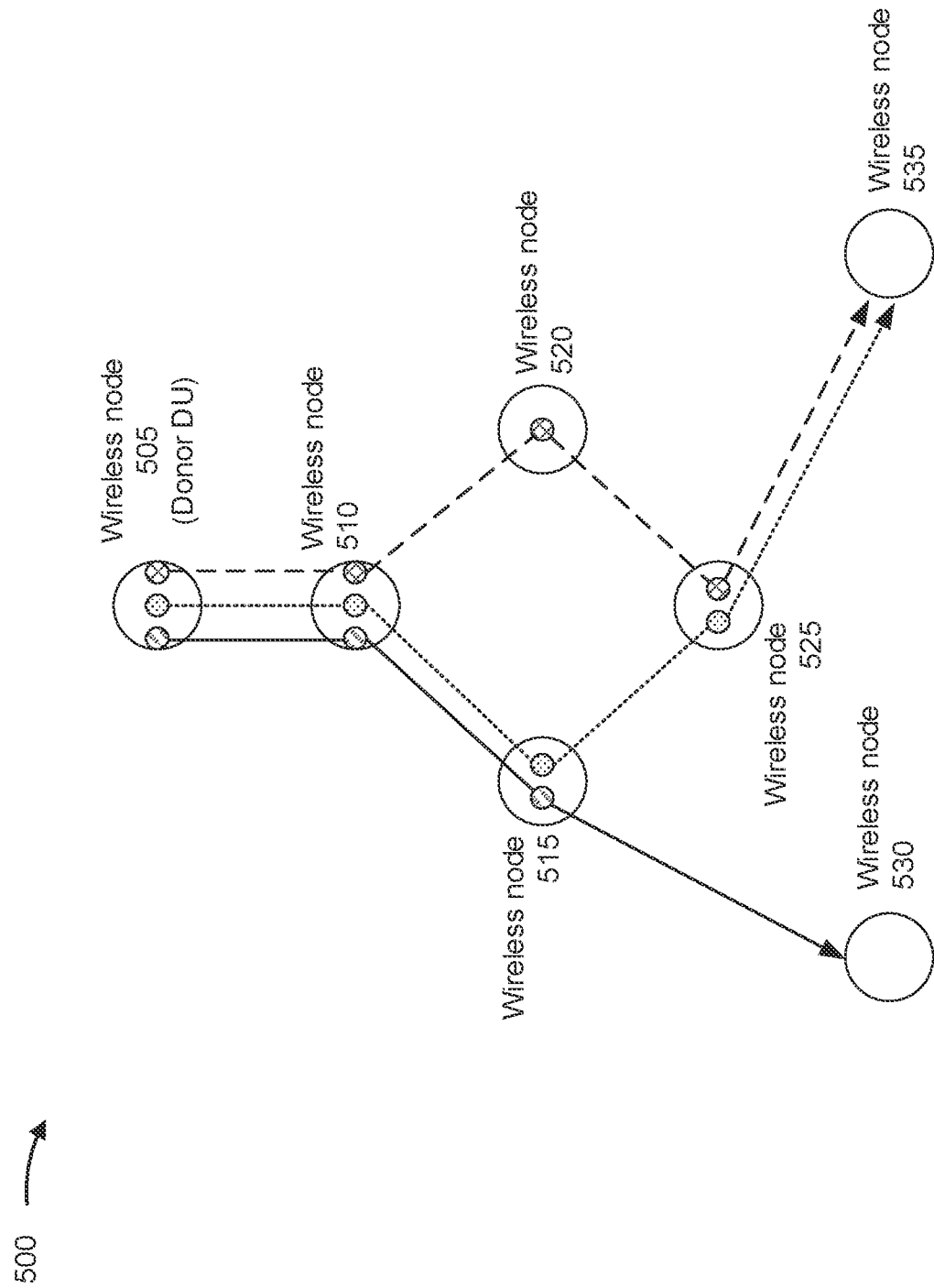
FIG. 5 is a diagram illustrating an example of a backhaul access protocol (BAP) layer in an IAB network architecture, in accordance with the present disclosure.

FIG. 5 is a diagram illustrating an example 500 of a backhaul access protocol (BAP) layer in an IAB network architecture, in accordance with the present disclosure.

As shown in FIG. 5, an IAB network architecture may include a set of wireless nodes, such as wireless node 505 (e.g., a donor DU) and a set of wireless nodes 510-535. The wireless nodes may be configured for communication using BAP, which may enable routing across a wireless backhaul formed by the IAB network architecture and may enable mapping of traffic to backhaul radio link control (RLC) channels (e.g., to support quality of service (QoS) differentiation). Messages using BAP may include a BAP header, which conveys a BAP routing identifier (e.g., a BAP address or a BAP path identifier). For example, a first BAP routing identifier may indicate a BAP address of wireless node 530 and a BAP path identifier for a path that includes wireless node 505, wireless node 510, wireless node 515, and wireless node 530. A wireless node may add a BAP header to a packet when the packet is passed to a BAP layer and/or a BAP entity of the wireless node. On intermediate hops through the IAB network architecture, wireless nodes may route a packet to a next hop based at least in part on the BAP routing identifier and a routing configuration (e.g., which may be configured by a donor CU of the IAB network architecture).

The BAP address may include information identifying a destination node for a packet. For example, for a packet being conveyed downstream, the BAP address may include information identifying a wireless node that is an access node for a UE, such as wireless node 530 or wireless node 535. Similarly, for a packet being conveyed upstream, the BAP address may include information identifying an IAB donor DU, such as wireless node 505. The BAP path identifier enables differentiation between a plurality of routes to the same destination node. For example, a second BAP routing identifier may identify a first path to a destination of wireless node 535 (e.g., a first path including wireless node 505, wireless node 510, wireless node 515, wireless node 525, and wireless node 535) and a second BAP routing identifier may identify a second path to the destination of wireless node 535 (e.g., a second path including wireless node 505, wireless node 510, wireless node 520, wireless node 525, and wireless node 535).

As indicated above, FIG. 5 is provided as an example. Other examples may differ from what is described with respect to FIG. 5.

Figure 6:
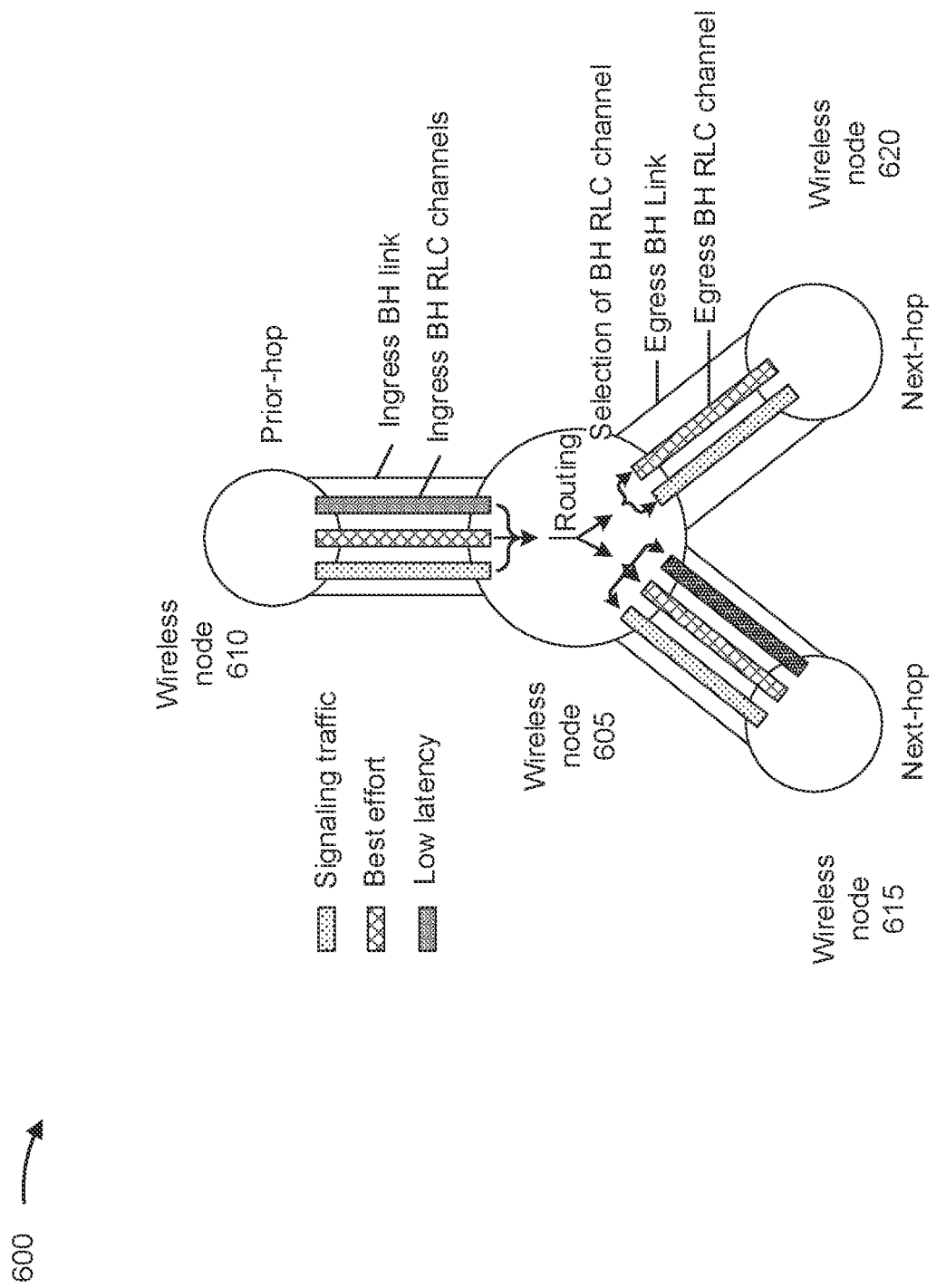
FIG. 6 is a diagram illustrating an example of channels associated with a BAP layer in an IAB network architecture, in accordance with the present disclosure.

FIG. 6 is a diagram illustrating an example 600 of channels associated with a BAP layer in an IAB network architecture, in accordance with the present disclosure.

As shown in FIG. 6, a wireless node 605 may receive a packet from a wireless node 610 (e.g., a prior hop) and route the packet to a wireless node 615 or a wireless node 620 (e.g., a next hop). Wireless node 605 may have a first set of channels established with wireless node 610, a second set of channels established with wireless node 615, and a third set of channels established with wireless node 620 for conveying BAP traffic (e.g., a packet). For example, on an ingress backhaul (BH) link, wireless node 605 may have a plurality of ingress backhaul radio link control (RLC) channels, such as a signaling traffic channel, a best effort channel, and a low latency channel. Similarly, on an egress backhaul link to wireless node 615, wireless node 620 may have a plurality of egress backhaul RLC channels, such as a signaling traffic channel, a best effort channel, and a low latency channel. However, wireless node 605 may not have all of the aforementioned RLC channels for each connection to each other wireless node. For example, on an egress backhaul link to wireless node 620 (e.g., a wireless node that, for example, does not implement low latency communication protocols, such as ultra-reliable low-latency communications (URLLC)), wireless node 615 may have a signaling traffic channel and a best effort channel (and not a low latency channel).

As indicated above, FIG. 6 is provided as an example. Other examples may differ from what is described with respect to FIG. 6.

In some communications systems, an energy saving mode is defined for a UE, a base station, or another type of wireless node. When operating in the energy saving mode, a particular wireless node may be unavailable for routing. In this case, a second wireless node may re-route network traffic to other wireless nodes rather than to the particular wireless node. However, in some cases, a plurality of wireless nodes may enter an energy saving mode, thereby preventing routing on a set of traffic routing paths associated therewith.

Some aspects described herein enable energy saving scheduling for traffic routing paths. For example, a central entity, such as a CU, may propagate an energy saving schedule for a set of BAP routing identifiers, and a wireless node may switch between routing using BAP routing identifiers of the set of BAP routing identifiers in accordance with the energy saving schedule. In other words, a wireless node may switch between a first BAP routing identifier and a second BAP routing identifier, thereby enabling wireless nodes to transition into and out of an energy saving mode in accordance with the energy saving schedule. In this way, by enabling central entity based energy saving scheduling, the central entity and the wireless node enable reduced power consumption with a reduced likelihood of dropped network traffic relative to each wireless node independently controlling activation and deactivation of an energy saving mode and traffic routing associated therewith.

Figure 7:
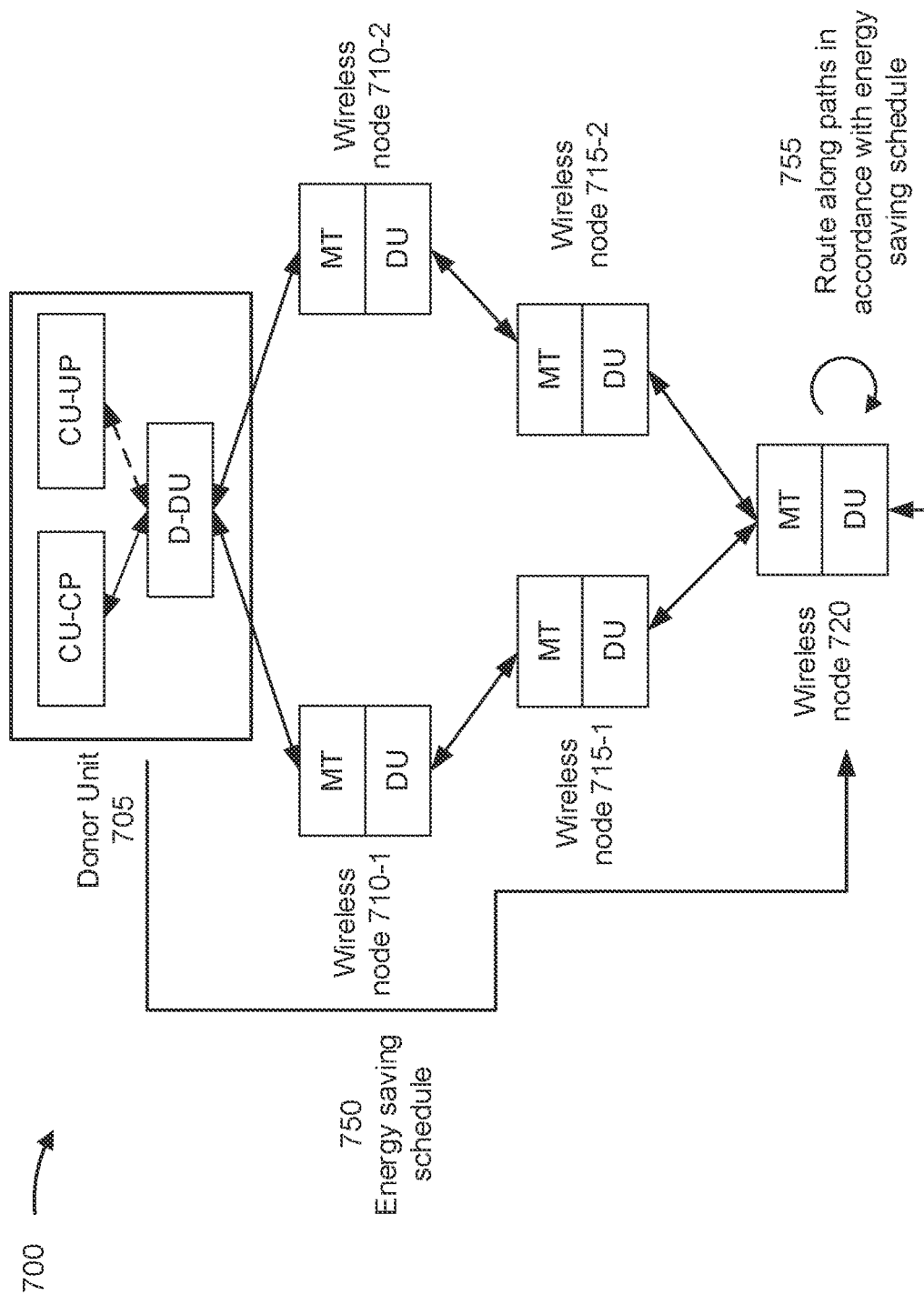
FIG. 7 is a diagram illustrating an example associated with local re-routing in IAB deployments, in accordance with the present disclosure.

FIG. 7 is a diagram illustrating an example 700 associated with central entity routing for IAB deployments, in accordance with the present disclosure. As shown in FIG. 7, example 700 includes an IAB network architecture that includes a donor unit 705 (e.g., which includes a central unit control plane (CU-CP) entity, a central unit user plane (CU-UP) entity, and a donor distributed unit (D-DU) entity), wireless nodes 710-720 (e.g., with respective mobile terminals (MTs) and DUs), and a UE 120.

As further shown in FIG. 7, and by reference number 750, donor unit 705 may provide, to wireless node 720, information identifying an energy saving schedule. For example, donor unit 705 may establish a connection with wireless node 720 and may provide, via one or more intermediate wireless nodes, information identifying a configuration to route traffic on one or more paths. In this case, donor unit 705 may indicate an energy saving configuration that wireless node 720 may activate or deactivate in accordance with the energy saving schedule. For example, donor unit 705 may configure wireless node 720 to route traffic to donor unit 705 from UE 120 via a first path (e.g., via wireless node 710-1 and wireless node 715-1) at a first time of the energy saving schedule and to route traffic via a second path (e.g., via wireless node 710-2 and wireless node 715-2) at a second time of the energy saving schedule. In this way, donor unit 705 and wireless node 720 may enable energy saving by wireless nodes 710 or 715 in accordance with the energy saving schedule.

In some aspects, wireless node 720 may receive information, in connection with the energy saving schedule, identifying a particular path for traffic routing. For example, wireless node 720 may receive information identifying a BAP routing identifier, a BAP path identifier, or a BAP destination address, among other examples. In some aspects, wireless node 720 may receive information identifying a plurality of paths sharing a common BAP destination address or BAP path identifier. For example, wireless node 720 may receive information identifying a first path with a BAP destination address associated with donor unit 705 and a second path with the same BAP destination address associated with donor unit 705.

In some aspects, wireless node 720 may receive information identifying a topology section corresponding to a path. For example, wireless node 720 may receive information identifying wireless node 710-1 and wireless node 715-1, from which wireless node 720 may identify a path via wireless node 710-1 and wireless node 715-1 to donor unit 705. In this case, the identified topology section may correspond to a configured BAP routing identifier. In some aspects, wireless node 720 may receive information identifying one or more backhaul RLC channels corresponding to a path, such as a first backhaul RLC channel between wireless node 720 and wireless node 715-1, a second backhaul RLC channel between wireless node 715-1 and wireless node 710-1, or a third backhaul RLC channel between wireless node 710-1 and donor unit 705.

In some aspects, wireless node 720 may receive information (e.g., a BAP configuration) identifying a traffic flow (e.g., upstream traffic, downstream traffic, uplink traffic, downlink traffic, or sidelink traffic, among other examples) that is to be routed via a path. For example, wireless node 720 may receive information identifying a traffic type (e.g., an F1 user plane (F1-U) tunnel, an F1 control (F1-C) tunnel for UE-associated traffic or non-UE-associated traffic, or a non F1 traffic type). Additionally, or alternatively, wireless node 720 may receive information identifying routing for traffic with a particular Internet Protocol (IP) header field value (e.g., a differentiated services code point (DSCP) field value or an IP version 6 (IPv6) flow label) or a particular BAP header field value (e.g., a BAP routing identifier value, a BAP path identifier value, a BAP destination address value), among other examples. Additionally, or alternatively, wireless node 720 may receive information identifying routing for traffic received on an identified ingress link or ingress backhaul RLC channel, traffic associated with a particular wireless node (e.g., a child node of wireless node 720), or traffic received from or generated by a particular wireless node, among other examples.

In some aspects, wireless node 720 may receive routing configuration information that includes an uplink mapping configuration. For example, wireless node 720 may receive information identifying a mapping of traffic types at a DU (e.g., of wireless node 720) to an outgoing routing identifier, egress link, or egress RLC channel, among other examples, at an MT (e.g., of wireless node 720). Additionally, or alternatively, the donor DU of donor unit 705 (or another wireless node) may receive routing configuration information that includes a downlink mapping configuration for mapping IP header fields of received traffic to a routing identifier, egress link, or egress RLC channel Additionally, or alternatively, wireless node 720 may receive routing configuration information associated with mapping a routing identifier or ingress link (e.g., of wireless node 720) to an egress link (e.g., of wireless node 720). Additionally, or alternatively, a wireless node (e.g., wireless node 715-1 or wireless node 720) may receive routing configuration information identifying a channel mapping configuration for mapping between an ingress RLC channel and an egress RLC channel (e.g., of wireless node 720).

In some aspects, wireless node 720 may identify an availability of a path based at least in part on the energy saving schedule. For example, wireless node 720 may receive information identifying the energy saving schedule and may determine a time when a path is available for routing a traffic flow or a time when a path is not available for routing a traffic flow. In some aspects, the availability of the path may be periodic. For example, wireless node 720 may identify a first periodicity for availability of a first path and may determine a second periodicity for availability of a second path. In this case, the first periodicity and the second periodicity may be configured such that wireless node 720 may switch between routing using the first path and routing using the second path to allow wireless nodes thereof to enter an energy saving mode when a path is not in use. In other words, donor unit 705 may configure a first energy saving schedule for a first path that indicates availability of the first path at a particular time and a second energy saving schedule for a second path that indicates an unavailability of the second path at the particular time.

In some aspects, wireless node 720 may determine an availability of a path in terms of an absolute time or in terms of a time duration (e.g., an amount of time that elapses from when a path becomes available to when a path becomes unavailable). In some aspects, wireless node 720 may determine an availability of a path in terms of a quality of service (QoS) requirement or a traffic flow type. For example, wireless node 720 may receive information indicating that a path is available for a first QoS level and unavailable for a second QoS level.

In some aspects, wireless node 720 may propagate the energy saving schedule to one or more other wireless nodes. For example, wireless node 720 may provide information identifying the energy saving schedule to wireless node 715-2 to enable wireless node 715-2 to configure whether to enter an energy saving mode in accordance with whether wireless node 715-2 is to receive traffic along a path in connection with the energy saving schedule.

As further shown in FIG. 7, and by reference number 755, wireless node 720 may route traffic along paths in accordance with the energy saving schedule. For example, wireless node 720 may route traffic along a first path at a first time of the energy saving schedule and along a second path at a second time of the energy saving schedule. In some aspects, wireless node 720 may buffer data of a traffic flow based at least in part on the energy saving schedule. For example, wireless node 720 may buffer a set of protocol data units (PDUs) of a traffic flow when a path is unavailable in accordance with the energy saving schedule. Additionally, or alternatively, wireless node 720 may route the traffic flow along an alternative path (e.g., to the same destination as the path that is unavailable). For example, when a first path to donor unit 705 via wireless nodes 710-1 and 715-1 is unavailable, wireless node 720 may route a traffic flow via wireless nodes 710-2 and 715-2 to donor unit 705. In this case, the first path and the second path may be configured for routing by donor unit 705 in connection with providing the energy saving schedule.

In some aspects, wireless node 720 may select an alternate path for routing from a set of possible paths. For example, wireless node 720 may be configured with a path and one or more alternate paths, and may select from the one or more alternate paths when the path is unavailable in connection with the energy saving schedule. In some aspects, wireless node 720 may apply a particular configuration to a path when routing using a path. For example, wireless node 720 may have a first configuration (e.g., for mapping between backhaul RLC channels) for a first path and a second configuration for a second path. In this case, wireless node 720 may apply the first configuration at a first time when the first path is available and may apply the second configuration at a second time when the second path is available (and the first path is unavailable).

As indicated above, FIG. 7 is provided as an example. Other examples may differ from what is described with respect to FIG. 7.

Figure 8:
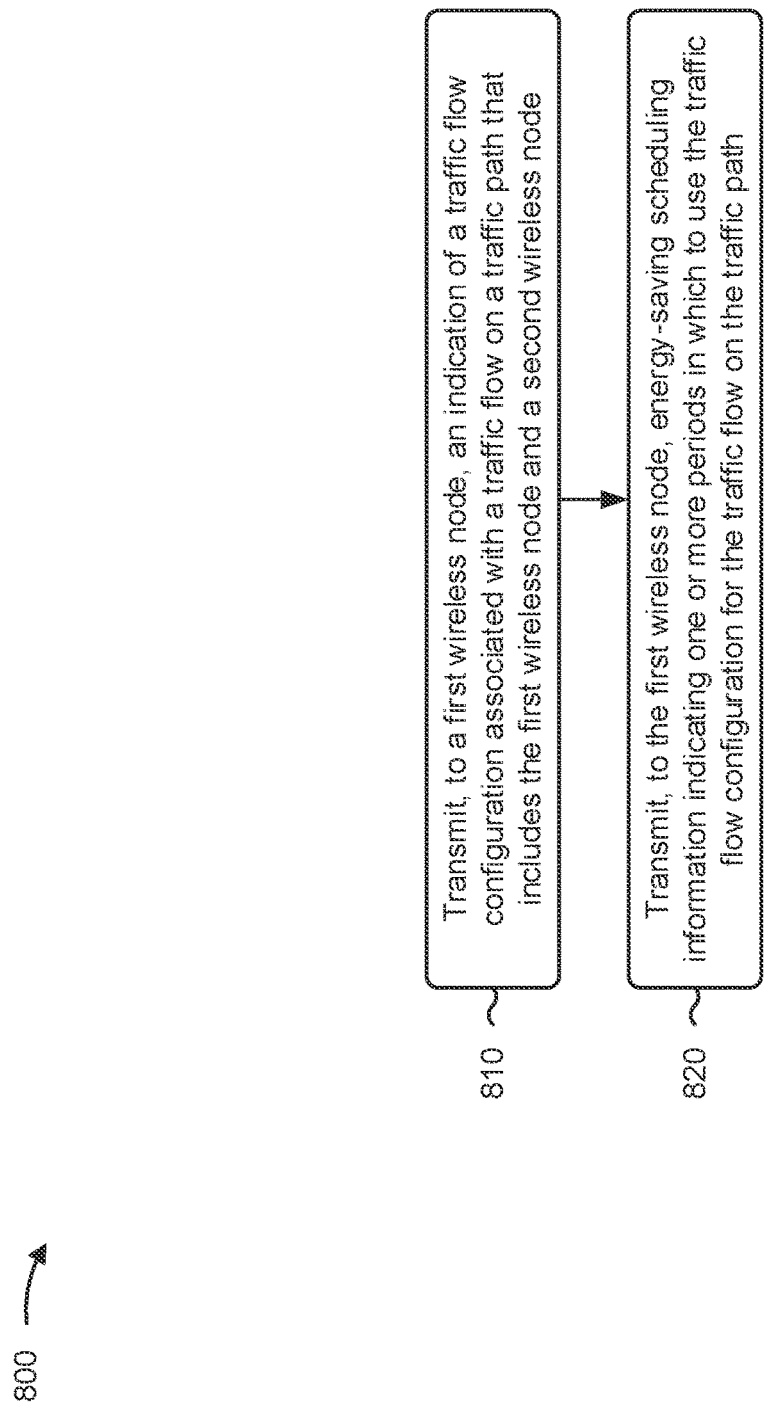
FIGS. 8-9 are diagrams illustrating example processes associated with central entity routing in IAB deployments, in accordance with the present disclosure.

FIG. 8 is a diagram illustrating an example process 800 performed, for example, by a central unit (CU), in accordance with the present disclosure. Example process 800 is an example where the CU (e.g., base station 110 or donor unit 705) performs operations associated with central entity routing for IAB deployments.

As shown in FIG. 8, in some aspects, process 800 may include transmitting, to a first wireless node, an indication of a traffic flow configuration associated with a traffic flow on a traffic path that includes the first wireless node and a second wireless node (block 810). For example, the CU (e.g., using communication manager 150 and/or transmission component 1004, depicted in FIG. 10) may transmit, to a first wireless node, an indication of a traffic flow configuration associated with a traffic flow on a traffic path that includes the first wireless node and a second wireless node, as described above.

As further shown in FIG. 8, in some aspects, process 800 may include transmitting, to the first wireless node, energy-saving scheduling information indicating one or more periods in which to use the traffic flow configuration for the traffic flow on the traffic path (block 820). For example, the CU (e.g., using communication manager 150 and/or transmission component 1004, depicted in FIG. 10) may transmit, to the first wireless node, energy-saving scheduling information indicating one or more periods in which to use the traffic flow configuration for the traffic flow on the traffic path, as described above. In some aspects, the indication of the traffic flow configuration and the energy-saving scheduling information may be included in the same or separate messages.

Process 800 may include additional aspects, such as any single aspect or any combination of aspects described below and/or in connection with one or more other processes described elsewhere herein.

In a first aspect, the traffic path is identified based at least in part on at least one of a backhaul adaptation protocol routing identifier, a backhaul adaptation protocol path identifier, a destination backhaul adaptation protocol address, a topology section, a set of wireless nodes, or a set of backhaul radio link control channels.

In a second aspect, the traffic flow is specific to at least one of a traffic type, an Internet protocol header field, a backhaul adaptation protocol field, an ingress link, an ingress backhaul radio link control channel, a child wireless node of the first wireless node, or the first wireless node.

In a third aspect, the traffic flow includes at least one of upstream traffic, downstream traffic, or sidelink traffic.

In a fourth aspect, the traffic flow configuration includes at least one of a backhaul adaptation protocol configuration, an uplink mapping configuration, a downlink mapping configuration, a routing mapping configuration, or a channel mapping configuration.

In a fifth aspect, the energy-saving scheduling information includes information identifying at least one of a timing of traffic path availability, a timing of traffic path unavailability, a periodicity of the traffic path availability or the traffic path unavailability, or a duration associated with the traffic path availability or the traffic path unavailability.

In a sixth aspect, the traffic flow configuration is a first traffic flow configuration, and the energy-saving scheduling information relates to a plurality of traffic flow configurations, such that when the first traffic flow configuration specifies an unavailability of the traffic path, a second traffic flow configuration, of the plurality of traffic flow configurations, specifies an availability of an alternate traffic path.

In a seventh aspect, an availability of the traffic path for the traffic flow is based at least in part on a quality of service parameter of the traffic flow.

In an eighth aspect, an availability of the traffic path for the traffic flow is based at least in part on a directionality of the traffic flow.

In a ninth aspect, process 800 includes providing information identifying the traffic flow configuration to at least one other wireless node associated with the traffic path.

In a tenth aspect, process 800 includes configuring re-routing of the traffic flow on an alternate traffic path for a period of unavailability of the traffic path in accordance with the traffic flow configuration and the energy-saving scheduling information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
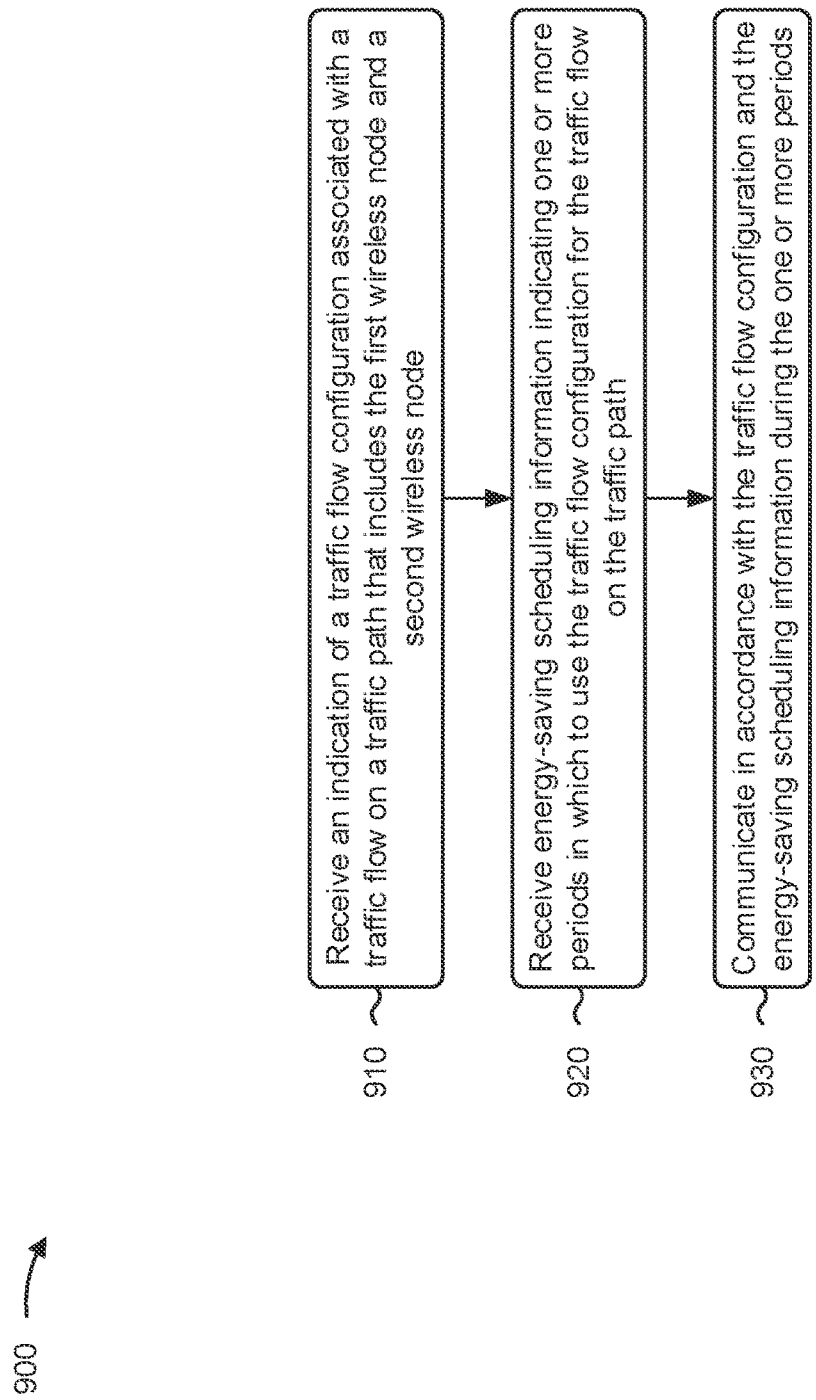

FIG. 9 is a diagram illustrating an example process 900 performed, for example, by a first wireless node, in accordance with the present disclosure. Example process 900 is an example where the first wireless node (e.g., base station 110 or wireless node 720) performs operations associated with central entity routing for IAB deployments.

As shown in FIG. 9, in some aspects, process 900 may include receiving an indication of a traffic flow configuration associated with a traffic flow on a traffic path that includes the first wireless node and a second wireless node (block 910). For example, the first wireless node (e.g., using communication manager 150 and/or reception component 1002, depicted in FIG. 10) may receive an indication of a traffic flow configuration associated with a traffic flow on a traffic path that includes the first wireless node and a second wireless node, as described above.

As further shown in FIG. 9, in some aspects, process 900 may include receiving energy-saving scheduling information indicating one or more periods in which to use the traffic flow configuration for the traffic flow on the traffic path (block 920). For example, the first wireless node (e.g., using communication manager 150 and/or reception component 1002, depicted in FIG. 10) may receive energy-saving scheduling information indicating one or more periods in which to use the traffic flow configuration for the traffic flow on the traffic path, as described above. In some aspects, the energy-saving scheduling information and the indication of the traffic flow configuration may be included in the same or separate messages.

As further shown in FIG. 9, in some aspects, process 900 may include communicating in accordance with the traffic flow configuration and the energy-saving scheduling information during the one or more periods (block 930). For example, the first wireless node (e.g., using communication manager 150 and/or reception component 1002 or transmission component 1004, depicted in FIG. 10) may communicate in accordance with the traffic flow configuration and the energy-saving scheduling information during the one or more periods, as described above.

Process 900 may include additional aspects, such as any single aspect or any combination of aspects described below and/or in connection with one or more other processes described elsewhere herein.

In a first aspect, the first wireless node is an integrated access and backhaul donor distributed unit.

In a second aspect, the traffic path is identified based at least in part on at least one of a backhaul adaptation protocol routing identifier, a backhaul adaptation protocol path identifier, a destination backhaul adaptation protocol address, a topology section, a set of wireless nodes, or a set of backhaul radio link control channels.

In a third aspect, the traffic flow is specific to at least one of a traffic type, an Internet protocol header field, a backhaul adaptation protocol field, an ingress link, an ingress backhaul radio link control channel, a child wireless node of the first wireless node, or the first wireless node.

In a fourth aspect, the traffic flow includes at least one of upstream traffic, downstream traffic, or sidelink traffic.

In a fifth aspect, the traffic flow configuration includes at least one of a backhaul adaptation protocol configuration, an uplink mapping configuration, a downlink mapping configuration, a routing mapping configuration, or a channel mapping configuration.

In a sixth aspect, the energy-saving scheduling information includes information identifying at least one of a timing of traffic path availability, a timing of traffic path unavailability, a periodicity of the traffic path availability or the traffic path unavailability, or a duration associated with the traffic path availability or the traffic path unavailability.

In a seventh aspect, the traffic flow configuration is a first traffic flow configuration, and the energy-saving scheduling information relates to a plurality of traffic flow configurations, such that when the first traffic flow configuration specifies an unavailability of the traffic path, a second traffic flow configuration, of the plurality of traffic flow configurations, specifies an availability of an alternate traffic path.

In an eighth aspect, an availability of the traffic path for the traffic flow is based at least in part on a quality of service parameter of the traffic flow.

In a ninth aspect, an availability of the traffic path for the traffic flow is based at least in part on a directionality of the traffic flow.

In a tenth aspect, process 900 includes buffering packet data units of the traffic flow during a period of unavailability of the traffic path in accordance with the traffic flow configuration and the energy-saving scheduling information.

In an eleventh aspect, process 900 includes re-routing the traffic flow on an alternate traffic path during a period of unavailability of the traffic path in accordance with the traffic flow configuration and the energy-saving scheduling information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
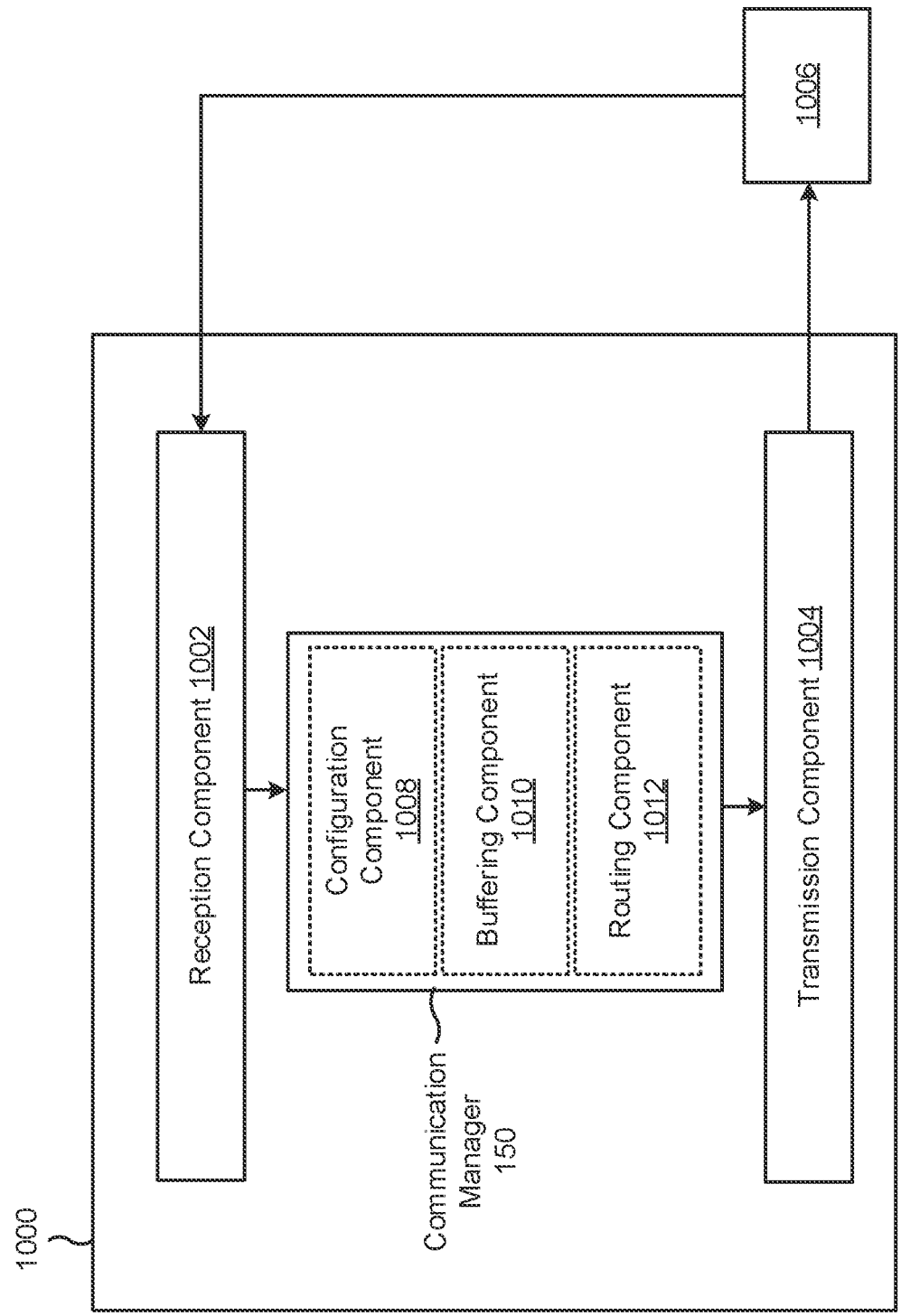
FIG. 10 is a block diagram of an example apparatus for wireless communication, in accordance with the present disclosure.

FIG. 10 is a block diagram of an example apparatus 1000 for wireless communication. The apparatus 1000 may be a wireless node or central unit, or a wireless node or central unit may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150) may include one or more of a configuration component 1008, a buffering component 1010, or a routing component 1012, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the wireless node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the wireless node described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the wireless node described in connection with FIG. 2. In some aspects, the transmission component 1004 may be co-located with the reception component 1002 in a transceiver.

The transmission component 1004 may transmit, to a first wireless node, an indication of a traffic flow configuration associated with a traffic flow on a traffic path that includes the first wireless node and a second wireless node. The transmission component 1004 may transmit, to the first wireless node, energy-saving scheduling information indicating one or more periods in which to use the traffic flow configuration for the traffic flow on the traffic path.

The transmission component 1004 may provide information identifying the traffic flow configuration to at least one other wireless node associated with the traffic path. The configuration component 1008 may configure re-routing of the traffic flow on an alternate traffic path for a period of unavailability of the traffic path in accordance with the traffic flow configuration and the energy-saving scheduling information.

The reception component 1002 may receive an indication of a traffic flow configuration associated with a traffic flow on a traffic path that includes the first wireless node and a second wireless node. The reception component 1002 may receive energy-saving scheduling information indicating one or more periods in which to use the traffic flow configuration for the traffic flow on the traffic path. The reception component 1002 and/or the transmission component 1004 may communicate in accordance with the traffic flow configuration and the energy-saving scheduling information during the one or more periods.

The buffering component 1010 may buffer packet data units of the traffic flow during a period of unavailability of the traffic path in accordance with the traffic flow configuration and the energy-saving scheduling information. The routing component 1012 may re-route the traffic flow on an alternate traffic path during a period of unavailability of the traffic path in accordance with the traffic flow configuration and the energy-saving scheduling information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a central unit (CU), comprising: transmitting, to a first wireless node, an indication of a traffic flow configuration associated with a traffic flow on a traffic path that includes the first wireless node and a second wireless node; and transmitting, to the first wireless node, energy-saving scheduling information indicating one or more periods in which to use the traffic flow configuration for the traffic flow on the traffic path.

Aspect 2: The method of Aspect 1, wherein the traffic path is identified based at least in part on at least one of: a backhaul adaptation protocol routing identifier, a backhaul adaptation protocol path identifier, a destination backhaul adaptation protocol address, a topology section, a set of wireless nodes, or a set of backhaul radio link control channels.

Aspect 3: The method of any of Aspects 1 to 2, wherein the traffic flow is specific to at least one of: a traffic type, an Internet protocol header field, a backhaul adaptation protocol field, an ingress link, an ingress backhaul radio link control channel, a child wireless node of the first wireless node, or the first wireless node.

Aspect 4: The method of any of Aspects 1 to 3, wherein the traffic flow includes at least one of upstream traffic, downstream traffic, or sidelink traffic.

Aspect 5: The method of any of Aspects 1 to 4, wherein the traffic flow configuration includes at least one of: a backhaul adaptation protocol configuration, an uplink mapping configuration, a downlink mapping configuration, a routing mapping configuration, or a channel mapping configuration.

Aspect 6: The method of any of Aspects 1 to 5, wherein the energy-saving scheduling information includes information identifying at least one of: a timing of traffic path availability, a timing of traffic path unavailability, a periodicity of the traffic path availability or the traffic path unavailability, or a duration associated with the traffic path availability or the traffic path unavailability.

Aspect 7: The method of any of Aspects 1 to 6, wherein the traffic flow configuration is a first traffic flow configuration, and wherein the energy-saving scheduling information relates to a plurality of traffic flow configurations, such that when the first traffic flow configuration specifies an unavailability of the traffic path, a second traffic flow configuration, of the plurality of traffic flow configurations, specifies an availability of an alternate traffic path.

Aspect 8: The method of any of Aspects 1 to 7, wherein an availability of the traffic path for the traffic flow is based at least in part on a quality of service parameter of the traffic flow.

Aspect 9: The method of any of Aspects 1 to 8, wherein an availability of the traffic path for the traffic flow is based at least in part on a directionality of the traffic flow.

Aspect 10: The method of any of Aspects 1 to 9, further comprising: providing information identifying the traffic flow configuration to at least one other wireless node associated with the traffic path.

Aspect 11: The method of any of Aspects 1 to 10, further comprising: configuring re-routing of the traffic flow on an alternate traffic path for a period of unavailability of the traffic path in accordance with the traffic flow configuration and the energy-saving scheduling information.

Aspect 12: A method of wireless communication performed by a first wireless node, comprising: receiving an indication of a traffic flow configuration associated with a traffic flow on a traffic path that includes the first wireless node and a second wireless node; receiving energy-saving scheduling information indicating one or more periods in which to use the traffic flow configuration for the traffic flow on the traffic path; and communicating in accordance with the traffic flow configuration and the energy-saving scheduling information during the one or more periods.

Aspect 13: The method of Aspect 12, wherein the first wireless node is an integrated access and backhaul donor distributed unit.

Aspect 14: The method of any of Aspects 12 to 13, wherein the traffic path is identified based at least in part on at least one of: a backhaul adaptation protocol routing identifier, a backhaul adaptation protocol path identifier, a destination backhaul adaptation protocol address, a topology section, a set of wireless nodes, or a set of backhaul radio link control channels.

Aspect 15: The method of any of Aspects 12 to 14, wherein the traffic flow is specific to at least one of: a traffic type, an Internet protocol header field, a backhaul adaptation protocol field, an ingress link, an ingress backhaul radio link control channel, a child wireless node of the first wireless node, or the first wireless node.

Aspect 16: The method of any of Aspects 12 to 15, wherein the traffic flow includes at least one of upstream traffic, downstream traffic, or sidelink traffic.

Aspect 17: The method of any of Aspects 12 to 16, wherein the traffic flow configuration includes at least one of: a backhaul adaptation protocol configuration, an uplink mapping configuration, a downlink mapping configuration, a routing mapping configuration, or a channel mapping configuration.

Aspect 18: The method of any of Aspects 12 to 17, wherein the energy-saving scheduling information includes information identifying at least one of: a timing of traffic path availability, a timing of traffic path unavailability, a periodicity of the traffic path availability or the traffic path unavailability, or a duration associated with the traffic path availability or the traffic path unavailability.

Aspect 19: The method of any of Aspects 12 to 18, wherein the traffic flow configuration is a first traffic flow configuration, and wherein the energy-saving scheduling information relates to a plurality of traffic flow configurations, such that when the first traffic flow configuration specifies an unavailability of the traffic path, a second traffic flow configuration, of the plurality of traffic flow configurations, specifies an availability of an alternate traffic path.

Aspect 20: The method of any of Aspects 12 to 19, wherein an availability of the traffic path for the traffic flow is based at least in part on a quality of service parameter of the traffic flow.

Aspect 21: The method of any of Aspects 12 to 20, wherein an availability of the traffic path for the traffic flow is based at least in part on a directionality of the traffic flow.

Aspect 22: The method of any of Aspects 12 to 21, further comprising: buffering packet data units of the traffic flow during a period of unavailability of the traffic path in accordance with the traffic flow configuration and the energy-saving scheduling information.

Aspect 23: The method of any of Aspects 12 to 24, further comprising: re-routing the traffic flow on an alternate traffic path during a period of unavailability of the traffic path in accordance with the traffic flow configuration and the energy-saving scheduling information.

Aspect 24: An apparatus for wireless communication at a device, comprising a processor; memory coupled with the processor; and instructions stored in the memory and executable by the processor to cause the apparatus to perform the method of one or more of Aspects 1-11.

Aspect 25: A device for wireless communication, comprising a memory and one or more processors coupled to the memory, the one or more processors configured to perform the method of one or more of Aspects 1-11.

Aspect 26: An apparatus for wireless communication, comprising at least one means for performing the method of one or more of Aspects 1-11.

Aspect 27: A non-transitory computer-readable medium storing code for wireless communication, the code comprising instructions executable by a processor to perform the method of one or more of Aspects 1-11.

Aspect 28: A non-transitory computer-readable medium storing a set of instructions for wireless communication, the set of instructions comprising one or more instructions that, when executed by one or more processors of a device, cause the device to perform the method of one or more of Aspects 1-11.

Aspect 29: An apparatus for wireless communication at a device, comprising a processor; memory coupled with the processor; and instructions stored in the memory and executable by the processor to cause the apparatus to perform the method of one or more of Aspects 12-23.

Aspect 30: A device for wireless communication, comprising a memory and one or more processors coupled to the memory, the one or more processors configured to perform the method of one or more of Aspects 12-23.

Aspect 31: An apparatus for wireless communication, comprising at least one means for performing the method of one or more of Aspects 12-23.

Aspect 32: A non-transitory computer-readable medium storing code for wireless communication, the code comprising instructions executable by a processor to perform the method of one or more of Aspects 12-23.

Aspect 33: A non-transitory computer-readable medium storing a set of instructions for wireless communication, the set of instructions comprising one or more instructions that, when executed by one or more processors of a device, cause the device to perform the method of one or more of Aspects 12-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A central unit (CU) for wireless communication, comprising:
    a one or more memories; and
    one or more processors, coupled to the one or more memories, configured to:
        transmit, to a first distributed unit, an indication of a traffic flow configuration associated with a traffic flow on a traffic path that includes the first distributed unit and a second distributed unit, the traffic path sharing a common backhaul access protocol (BAP) path identifier with an alternate traffic path associated with the first distributed unit; and
        transmit, to the first distributed unit, energy-saving scheduling information identifying the traffic path and the alternate traffic path, the energy-saving scheduling information indicating one or more periods in which the first distributed unit is to use the traffic flow configuration for the traffic flow on the traffic path, wherein the energy-saving scheduling information includes information identifying a periodicity of an availability of the traffic path or an unavailability of the traffic path; and
        communicate with the first distributed unit in accordance with the traffic flow configuration and the energy-saving scheduling information during the one or more periods.

2. The CU of claim 1, wherein the traffic path or the alternate traffic path is identified based at least in part on at least one of:
    a backhaul adaptation protocol routing identifier,
    a backhaul adaptation protocol path identifier,
    a destination backhaul adaptation protocol address,
    a topology section,
    a set of wireless nodes, or
    a set of backhaul radio link control channels.

3. The CU of claim 1, wherein the traffic flow is specific to at least one of:
    a traffic type,
    an Internet protocol header field,
    a backhaul adaptation protocol field,
    an ingress link,
    an ingress backhaul radio link control channel,
    a child wireless node of the first distributed unit, or
    the first distributed unit.

4. The CU of claim 1, wherein the traffic flow includes at least one of upstream traffic, downstream traffic, or sidelink traffic.

5. The CU of claim 1, wherein the traffic flow configuration includes at least one of:
    a backhaul adaptation protocol configuration,
    an uplink mapping configuration,
    a downlink mapping configuration,
    a routing mapping configuration, or
    a channel mapping configuration.

6. The CU of claim 1, wherein the energy-saving scheduling information further includes information identifying at least one of:
    a timing of traffic path availability,
    a timing of traffic path unavailability, or
    a duration associated with the availability or unavailability of the traffic path.

7. The CU of claim 1, wherein the traffic flow configuration is a first traffic flow configuration, and wherein the energy-saving scheduling information relates to a plurality of traffic flow configurations, such that when the first traffic flow configuration specifies the unavailability of the traffic path, a second traffic flow configuration, of the plurality of traffic flow configurations, specifies an availability of the alternate traffic path.

8. The CU of claim 1, wherein the availability of the traffic path for the traffic flow is based at least in part on a quality of service parameter of the traffic flow.

9. The CU of claim 1, wherein the availability of the traffic path for the traffic flow is based at least in part on a directionality of the traffic flow.

10. The CU of claim 1, wherein the one or more processors are further configured to:
    provide information identifying the traffic flow configuration to at least one other wireless node associated with the traffic path.

11. The CU of claim 1, wherein the one or more processors are further configured to:
configure re-routing of the traffic flow on the alternate traffic path for a period of unavailability of the traffic path in accordance with the traffic flow configuration and the energy-saving scheduling information.

12. A first distributed unit for wireless communication, comprising:
a one or more memories; and
one or more processors, coupled to the one or more memories, configured to:
receive an indication of a traffic flow configuration associated with a traffic flow on a traffic path that includes the first distributed unit and a second distributed unit, the traffic path sharing a common backhaul access protocol (BAP) path identifier with an alternate traffic path associated with the first distributed unit;
receive energy-saving scheduling information identifying the traffic path and the alternate traffic path, the energy-saving scheduling information indicating one or more periods in which the first distributed unit is to use the traffic flow configuration for the traffic flow on the traffic path, wherein the energy-saving scheduling information includes information identifying a periodicity of an availability of the traffic path or an unavailability of the traffic path; and
communicate in accordance with the traffic flow configuration and the energy-saving scheduling information during the one or more periods.

13. The first distributed unit of claim 12, wherein the first distributed unit is an integrated access and backhaul donor distributed unit.

14. The first distributed unit of claim 12, wherein the traffic path or the alternate traffic path is identified based at least in part on at least one of:
a backhaul adaptation protocol routing identifier,
a backhaul adaptation protocol path identifier,
a destination backhaul adaptation protocol address,
a topology section,
a set of wireless nodes, or
a set of backhaul radio link control channels.

15. The first distributed unit of claim 12, wherein the traffic flow is specific to at least one of:
a traffic type,
an Internet protocol header field,
a backhaul adaptation protocol field,
an ingress link,
an ingress backhaul radio link control channel,
a child wireless node of the first distributed unit, or
the first distributed unit.

16. The first distributed unit of claim 12, wherein the traffic flow includes at least one of upstream traffic, downstream traffic, or sidelink traffic.

17. The first distributed unit of claim 12, wherein the traffic flow configuration includes at least one of:
a backhaul adaptation protocol configuration,
an uplink mapping configuration,
a downlink mapping configuration,
a routing mapping configuration, or
a channel mapping configuration.

18. The first distributed unit of claim 12, wherein the energy-saving scheduling information further includes information identifying at least one of:
a timing of traffic path availability,
a timing of traffic path unavailability, or
a duration associated with the availability or the unavailability of the traffic path.

19. The first distributed unit of claim 12, wherein the traffic flow configuration is a first traffic flow configuration, and wherein the energy-saving scheduling information relates to a plurality of traffic flow configurations, such that when the first traffic flow configuration specifies the unavailability of the traffic path, a second traffic flow configuration, of the plurality of traffic flow configurations, specifies an availability of the alternate traffic path.

20. The first distributed unit of claim 12, wherein the availability of the traffic path for the traffic flow is based at least in part on a quality of service parameter of the traffic flow.

21. The first distributed unit of claim 12, wherein the availability of the traffic path for the traffic flow is based at least in part on a directionality of the traffic flow.

22. The first distributed unit of claim 12, wherein the one or more processors are further configured to:
buffer packet data units of the traffic flow during a period of unavailability of the traffic path in accordance with the traffic flow configuration and the energy-saving scheduling information.

23. The first distributed unit of claim 12, wherein the one or more processors are further configured to:
re-route the traffic flow on an alternate traffic path during a period of unavailability of the traffic path in accordance with the traffic flow configuration and the energy-saving scheduling information.

24. A method of wireless communication performed by a central unit (CU), comprising:
transmitting, to a first distributed unit, an indication of a traffic flow configuration associated with a traffic flow on a traffic path that includes the first distributed unit and a second distributed unit, the traffic path sharing a common backhaul access protocol (BAP) path identifier with an alternate traffic path associated with the first distributed unit;
transmitting, to the first distributed unit, energy-saving scheduling information identifying the traffic path and the alternate traffic path, the energy-saving scheduling information indicating one or more periods in which the first distributed unit is to use the traffic flow configuration for the traffic flow on the traffic path, wherein the energy-saving scheduling information includes information identifying a periodicity of an availability of the traffic path or an unavailability of the traffic path; and
communicating with the first distributed unit in accordance with the traffic flow configuration and the energy-saving scheduling information during the one or more periods.

25. The method of claim 24, wherein the traffic path or the alternate traffic path is identified based at least in part on at least one of:
a backhaul adaptation protocol routing identifier,
a backhaul adaptation protocol path identifier,
a destination backhaul adaptation protocol address,
a topology section,
a set of wireless nodes, or
a set of backhaul radio link control channels.

26. The method of claim 24, wherein the traffic flow is specific to at least one of:
a traffic type,
an Internet protocol header field,
a backhaul adaptation protocol field,
an ingress link, an ingress backhaul radio link control channel,
a child wireless node of the first distributed unit, or
the first distributed unit.

27. A method of wireless communication performed by a first distributed unit, comprising:
receiving an indication of a traffic flow configuration associated with a traffic flow on a traffic path that includes the first distributed unit and a second distributed unit, the traffic path sharing a common backhaul access protocol path identifier with an alternate traffic path associated with the first distributed unit;
receiving energy-saving scheduling information identifying the traffic path and the alternate traffic path, the energy-saving scheduling information indicating one or more periods in which to use the traffic flow configuration for the traffic flow on the traffic path, wherein the energy-saving scheduling information includes information identifying a periodicity of an availability of the traffic path or an unavailability of the traffic path; and
communicating in accordance with the traffic flow configuration and the energy-saving scheduling information during the one or more periods.

28. The method of claim 27, wherein the first distributed unit is an integrated access and backhaul donor distributed unit.

29. The method of claim 27, wherein the traffic path or the alternate traffic path is identified based at least in part on at least one of:
a backhaul adaptation protocol routing identifier,
a backhaul adaptation protocol path identifier,
a destination backhaul adaptation protocol address,
a topology section,
a set of wireless nodes, or
a set of backhaul radio link control channels.

30. The method of claim 27, wherein the traffic flow is specific to at least one of:
a traffic type,
an Internet protocol header field,
a backhaul adaptation protocol field,
an ingress link,
an ingress backhaul radio link control channel,
a child wireless node of the first distributed unit, or
the first distributed unit.

* * * * *